Figure 3:
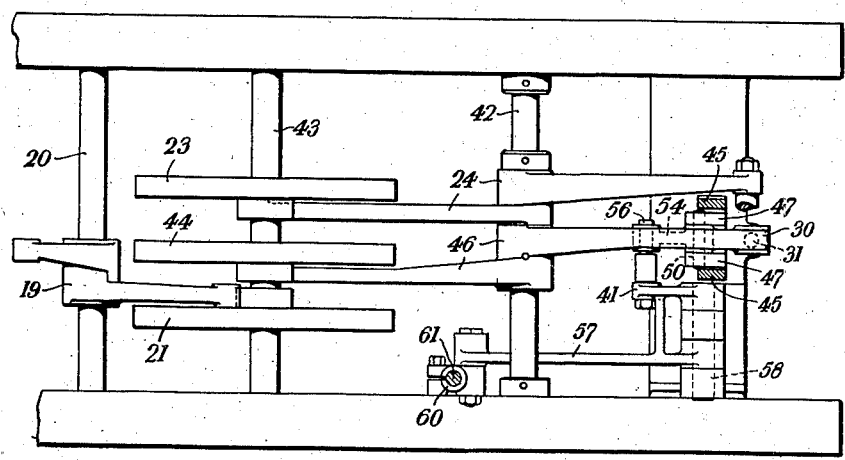

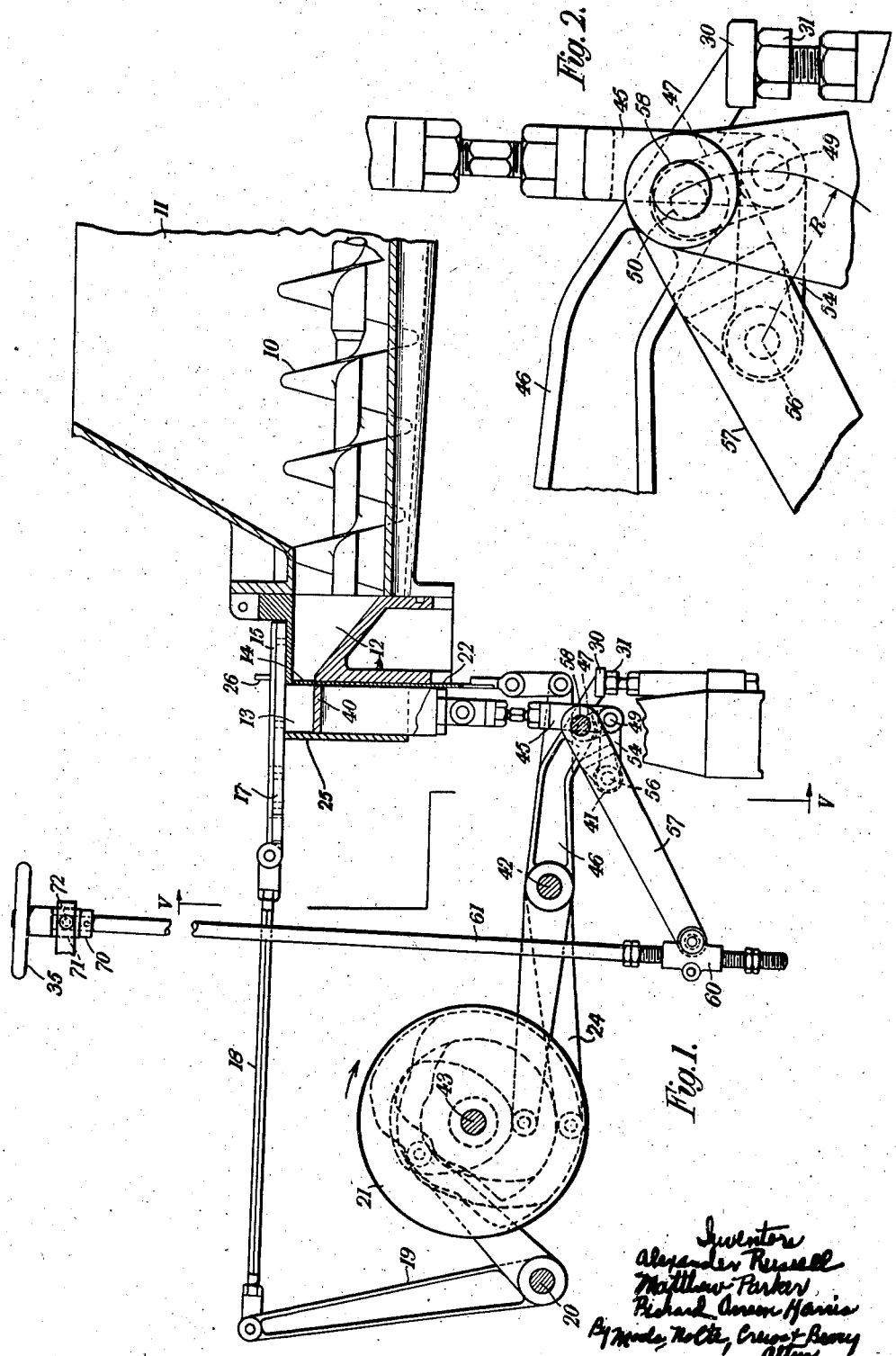

Patented May 8, 1945

2,375,693

UNITED STATES PATENT OFFICE 2,375,693

MECHANISM FOR ADJUSTING THE STROKE OF A RECIPROCATING OR OSCILLATING MEMBER, SUCH AS A DIE PLUNGER IN AN EXTRUSION OR MOLDING PRESS

Alexander Russell, Matthew Parker, and Richard Anson Harris, Leeds, England, assignors to The Forgrove Machinery Company Limited, Leeds, England Application February 24, 1944, Serial No. 523,686
In Great Britain January 25, 1943

5 Claims. (Cl. 31—8)

The object of the invention is to provide an improved mechanism for adjusting the stroke of a reciprocating or oscillating member, such that the adjustment can be performed while the member is in motion, and such that one end position of the stroke of the member is unaffected by the adjustment, the other end position only being altered.

An adjusting mechanism of this character is, for example, desirable in a plastic extruding machine, in which a die plunger reciprocates in a die chamber of which it forms the bottom when in its lower position, the top of the chamber being covered by a horizontally slidable plate during the time while the material is being extruded into the chamber through one of its sides. When extrusion is completed, the top plate is slid back to allow the plunger to lift the extruded block out of the chamber, and afterwards returns to push the block off the plunger. It is consequently important that the top of the die plunger, when in its up position, should be exactly level with the under surface of the top plate, so that when the latter moves forward to close the chamber again it will push the block of material off the die plunger cleanly, leaving a minimum of material sticking to the plunger.

When this dual purpose forward movement of the top plate is completed the die plunger descends, ready for the next extrusion. Regulation of the amount of material contained in the extruded blocks has to be effected by altering the volume of the extrusion chamber. The invention enables this to be done—whilst the machine is running if necessary—by adjusting the stroke of the die plunger, and as the top position of the plunger must never change the whole of the variation takes place at the lower position.

The invention provides the combination with an adjustable-stroke reciprocating or oscillating member, of mechanism operable to adjust its stroke while said member is in motion, which mechanism comprises a fixed-stroke actuating member, a normally stationary stroke-adjusting member, a linkage connecting the actuating member and the stroke-adjusting member, a driving member (e. g., a pin) driven by said linkage to execute to-and-fro movement from a fixed datum point, and a driving connection between the driving member and the adjustable-stroke member, operation of the stroke-adjusting member serving to effect angular adjustment of the path of movement of the driving member in relation to its fixed datum point, and thereby to vary the effective stroke of the driving connection.

As for all positions of adjustment of the stroke-adjusting member, the driving member invariably comes to rest at a fixed point at one end of its to-and-fro movement, one end position of the stroke of the adjustable-stroke member will be unaffected by the adjustment. By displacing the other end position of the path of movement of the driving member, however, operation of the stroke-adjusting member will, by the consequent variation in the effective stroke of the driving connection, alter the other end position of the stroke of the adjustable-stroke member.

A preferred form of stroke-adjusting mechanism according to the invention comprises, in combination with the member of which the stroke is to be adjusted, and a fixed-stroke oscillating actuating lever for communicating reciprocating or oscillatory motion to said member, an adjustable lever pivoted on a fixed centre, an operating pin coupled to said member, a first link pivotally connected at its opposite ends to the operating pin and to the actuating lever and a second link pivotally connected at its opposite ends to the operating pin and to the adjustable lever, the length of the second link being equal to the distance between its pivotal connection to the adjustable lever and the fixed centre, and the arrangement being such that the operating pin is brought into line with the fixed centre, on each cycle of operation, at one of its two extreme positions.

With this arrangement the adjustable lever remains fixed, except when an adjustment is made, and the operating pin describes a circular arc, under the control of the first link, about the point of attachment of the second link to the adjustable lever as centre, one end of this circular arc being located at the point at which it meets the projection of the fixed centre; when the adjustable lever is moved about the fixed centre for adjustment purposes, the centre of oscillation of the operating pin is of course displaced and the arc in which it travels moves bodily to a corresponding extent about the fixed centre. The extreme position of the operating pin at one end of the arc remains coincident with the fixed centre, but its position at the other end of the arc is of course varied as a result of such adjustment, so varying the stroke of the member to be adjusted.

One specific application of the invention, as applied to the adjustment of the stroke of the die plunger of a machine for wrapping plastic material, such as margarine, butter or the like, will now be described in greater detail, by way of example, with reference to the accompanying drawings, in which—

Figure 4:
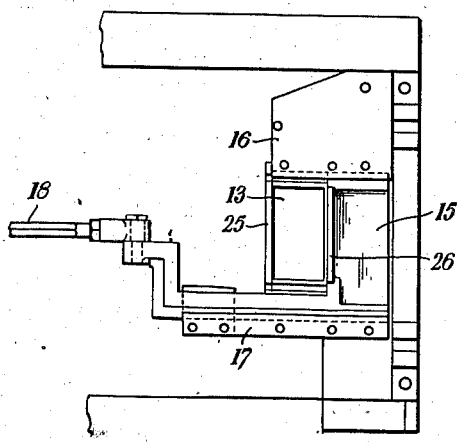
Figure 5:
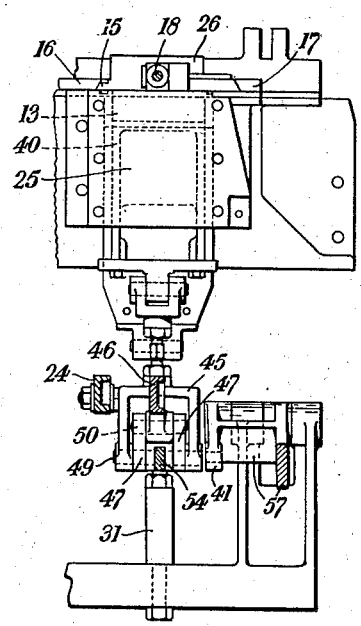
Figure 6:
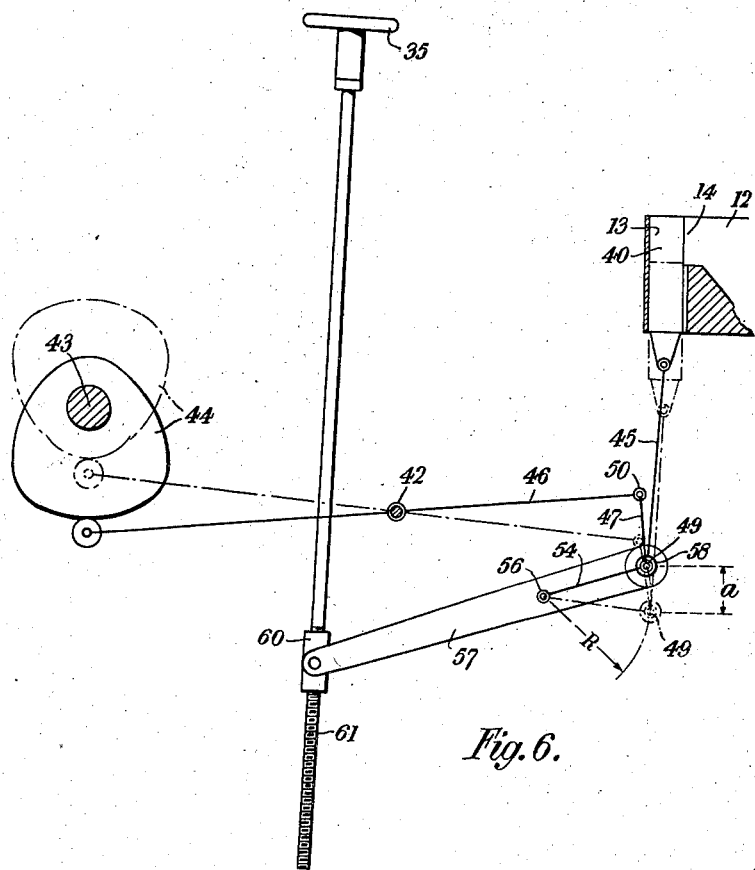
Figure 7:
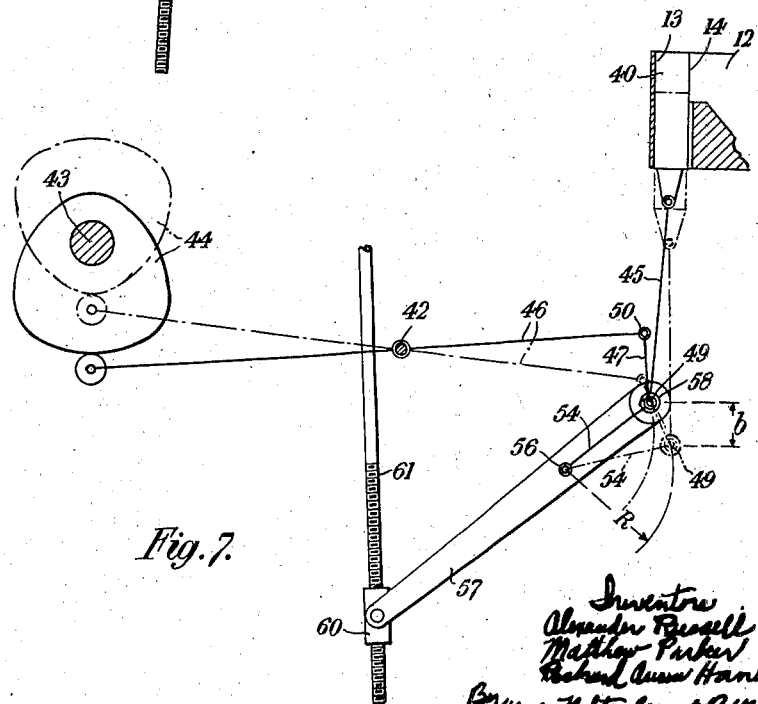

Fig. 1 is a side elevation partly in section of the die chamber, charging mechanism therefor, die-plunger and associated operating gear, Fig. 2 is an enlarged side elevation of part of the mechanism for adjusting the stroke of the die plunger, Fig. 3 is a plan view of the stroke-adjusting mechanism, Fig. 4 is a plan view of the upper part of the die chamber and its movable top cover, Fig. 5 is a section on line V—V in Fig. 1, and Figs. 6 and 7 are diagrammatic views of the stroke-adjusting gear showing the latter in two alternative positions of adjustment.

Like reference numerals designate like parts throughout the drawings.

The margarine is fed, by intermittently rotating feed worms, one of which is indicated at 10 in Fig. 1, from a feed hopper 11 to an extrusion box 12 located to one side of a rectangular section die chamber 13. In the die-chamber is a reciprocating die plunger 40, which constitutes the bottom of the chamber. The chamber is charged with margarine through the lateral opening 14 when the die plunger is in its bottom position shown in Fig. 1. The top of the die-chamber is closed during extrusion, by a sliding top cover plate 15, which moves in guides in fixed brackets 16, 17 (Figs. 4 and 5) and is operated by a rod 18 linked to a bell crank 19, which is periodically rocked to-and-fro about a fixed shaft 20 by a cam 21 on the cam shaft 43 (Fig. 3). A reciprocating knife 22 controls communication between the extrusion box 12 and the die chamber 13, the knife being operated by a cam 23 through the agency of a lever 24 pivoted on a fixed shaft 42 (Fig. 3). During extrusion the knife is in the down position, permitting of extrusion of the margarine from the extrusion box into the die chamber. After the feed worms 10 have ceased to rotate, the knife 22 moves up to close the extrusion orifice, the displacement of margarine caused by this upward movement of the knife ensuring that the die chamber is completely filled. The knife, when in the up position, cuts off the die chamber from residual pressure in the extrusion box. When the material is soft this residual pressure might, but for the presence of the knife, cause some of the material to ooze out of the top of the die chamber as soon as the top plate 15 begins to uncover the die chamber. Holes may, if desired, be provided in the wall 25 of the die box opposite the extrusion box, to permit of egress of air and surplus margarine from the die box on ascent of the knife. These holes are, however, not essential.

The top cover plate 15 moves to open the top of the die chamber when extrusion has been completed, and this is the state of affairs shown in Fig. 1. Immediately afterwards the plunger 40 rises to its top position, in which its upper surface is level with the undersurface of the top cover plate 15. The latter then slides to the left (Fig. 1), whereupon an upstanding flange 26 on the top cover plate pushes the extruded block of margarine off the die plunger 40 and on to a lifting plunger (not shown).

It will be understood that the top position of the die plunger 40 must under all conditions remain invariable. Means are, however, provided for altering its bottom position, and so the volume of margarine extruded at each stroke from the die chamber.

The wrapping machine is required to operate continuously all day, and is not stopped when a fresh batch of margarine is put in. As the material varies, mainly due to differences of temperature, and tends to feed irregularly on this account, it is essential to be able to adjust the quantity of material extruded per cycle while the machine is running. This is achieved by varying the bottom datum point of the stroke of the plunger as will now be described.

The plunger movement is derived from an actuating lever 46 which is oscillated about the fixed shaft 42 by a cam 44 on the cam shaft 43. To this actuating lever 46 is pivoted at 50 a first link 47 pivoted at its other end to an operating pin 49, which in turn is pivoted to a link end 45 connected to the plunger 40. This link end 45 thus constitutes a driving connection between the pin 49 and the plunger 40, the effective stroke of which is variable as described below. The mechanism includes an adjustable lever 57 pivoted at one end on a fixed pin 58 and pinned at its other end to a nut 60 carried on a screwed adjusting rod 61 fitted with a hand-wheel 35 which is turned when it is desired to displace the adjustable lever 57 about the fixed centre constituted by the centre of the pin 58. Mounted on the rod 61 (see Fig. 1), between the hand-wheel 35 and a collar 70 pinned to the rod, is a bearing sleeve 71 carrying a projecting pin 72 which is journalled in a fixed frame member of the machine, so permitting the rod to swivel relatively to the machine frame (see Figs. 6 and 7) as the lever 57 swings about the pin 58 to adjust the stroke of the plunger.

On a boss 41 on the adjustable lever is a pin 56 located at radius R from the fixed centre. A link 54 of radius R is pivoted at its opposite ends to this pin 56 and to the operating pin 49. The mechanism therefor consists of a closed or stable system of links, viz., the actuating lever 46, the adjustable lever 57, the first link 47 and the second link 54; and the movement communicated to the actuating lever 46 by the cam 44 is such that in one of its two extreme positions the actuating lever 46 brings the operating pin 49 into alignment with the fixed centre, as shown in full lines in Figs. 6 and 7. In each of these figures the parts are shown in chain-dotted lines in the position they occupy in the other extreme position. Adjustment of the screwed rod 61 will not vary this condition of alignment of the operating pin with the fixed centre but only the position to which the operating pin 49 is moved at the other end of its arcuate path about the pin 56 attaching the second link 54 to the adjustable lever 57. The required adjustment of the bottom datum point of the plunger stroke can consequently be effected, while the machine is running, by turning the hand wheel 35 on the screwed rod 61.

Stroke adjustment is possible at all times, because the linkage can never occupy a position in which the mechanism might jam, and because the adjusting wheel 35 is stationary while the machine is running.

It will be appreciated, from a consideration of Figs. 6 and 7, that the operating pin 49 always executes a to-and-fro movement in an arcuate path one end of which is a fixed datum point constituted by the fixed centre of the pin 58. The arcuate paths for two different positions of adjustment of the lever 57 are shown in dot and dash lines in Figs. 6 and 7. In Fig. 7 the arc in chain-dotted lines is that corresponding to the condition of Fig. 6 and it will readily be seen that adjustment of the lever 57 causes the arcuate path of the pin 49 to move angularly about the fixed datum point. The effective stroke of the driving link 45 is represented by $a$ in Fig. 6 and by $b$ in Fig. 7. It is clearly less in Fig. 7, so that in this case the stroke of the plunger 40 will be shorter (i. e., have a higher bottom datum point) than in Fig. 6.

The actuating lever 46 has an extension 30 which, when said lever is in the extreme position (see Figs. 1 and 2) corresponding to the bottom position of the plunger, abuts against a fixed stop 31 and so relieves the cam 44 from the forces developed in the die chamber by the extrusion operation.

What we claim as our invention and desire to secure by Letters Patent is:

1. The combination with an adjustable-stroke driven member, and a fixed-stroke actuating member for imparting motion to said driven member, of mechanism for adjusting the stroke of said driven member while said member is in motion, said mechanism comprising a normally stationary stroke-adjusting member, a linkage connecting the actuating member and the stroke-adjusting member, a driving member driven by said linkage to execute movement to and from a fixed terminal point, a driving connection between said driving member and the driven member, and means operable by the stroke-adjusting member to effect angular adjustment of the path of movement of the driving member about said fixed terminal point and thereby to vary the effective stroke of the driving connection.

2. The combination with an adjustable-stroke reciprocating driven member, and a fixed-stroke actuating member for imparting motion to said driven member, of mechanism for adjusting the stroke of said driven member while said member is in motion, said mechanism comprising a normally stationary stroke-adjusting member, a linkage connecting the actuating member and the stroke-adjusting member, a driving pin driven by said linkage to execute movement to and from a fixed terminal point, a driving connection between said driving pin and the driven member, and means operable by the stroke-adjusting member to effect angular adjustment of the path of movement of the driving pin about said fixed terminal point and thereby to vary the effective stroke of the driving connection.

3. The combination with an adjustable-stroke driven member, of a stroke-adjusting mechanism comprising a fixed stroke oscillating actuating lever for imparting motion to the driven member, an adjustable lever pivoted on a fixed centre, an operating pin, a driving connection between the operating pin and the driven member, a first link pivotally connected at its opposite ends to the operating pin and to the actuating lever, and a second link pivotally connected at its opposite ends to the operating pin and to the adjustable lever, the length of said second link being equal to the distance between the fixed centre and the point of pivotal connection of the second link to the adjustable lever, and said links serving, in all positions of adjustment, to maintain the operating pin in oscillation in an arcuate path one terminal whereof is in alignment with the fixed centre.

4. In a machine for extruding plastic material in shaped blocks, the combination with an adjustable stroke reciprocating driven die plunger, and a fixed stroke actuating member imparting motion to said driven member, of mechanism for adjusting the stroke of said die plunger while the plunger is in motion, said mechanism comprising a normally stationary stroke adjusting member, a linkage connecting the actuating member and the stroke adjusting member, a driving pin driven by said linkage to execute movement to and from a fixed terminal point, a driving connection between said driving pin and the plunger, and means operable by the stroke adjusting member to effect angular adjustment of the path of movement of the driving pin about said fixed terminal point, thereby to vary the effective stroke of the driving connection.

5. In a machine for wrapping plastic material, the combination with a die chamber, of means for charging the die chamber with plastic material, a reciprocating variable stroke die plunger constituting the bottom of the die chamber and operating to discharge shaped blocks of the plastic material from the top of said chamber, a top cover for the die chamber, means for moving said cover to close the top of the chamber during charging and to open the top of the chamber during the delivery stroke of the plunger, and means for adjusting the bottom limit of the stroke of the die plunger while the top limit of its stroke remains unaltered comprising a fixed stroke actuating member for imparting motion to the die plunger, a normally stationary stroke-adjusting member, a linkage connecting the actuating member and the stroke-adjusting member, a driving pin driven by said linkage to execute movement to and from a fixed datum point, a driving connection between said driving pin and the die plunger, and means operable by the stroke-adjusting member to effect angular adjustment of the path of movement of the driving pin about said fixed datum point and thereby to vary the effective stroke of the driving connection.

ALEXANDER RUSSELL.
MATTHEW PARKER.
RICHARD ANSON HARRIS.